United States Patent [19]
Trutna, Jr.

[11] Patent Number: 5,007,065
[45] Date of Patent: Apr. 9, 1991

[54] BILITHIC UNIDIRECTIONAL RING LASER

[75] Inventor: William R. Trutna, Jr., Atherton, Calif.

[73] Assignee: Hewlett-Packard Company, Palo Alto, Calif.

[21] Appl. No.: 234,432

[22] Filed: Aug. 19, 1988

[51] Int. Cl.$^5$ .............................................. H01S 3/083
[52] U.S. Cl. ..................................... 372/94; 372/20; 372/66
[58] Field of Search ................. 372/20, 37, 50, 66, 372/70, 92–94; 356/350

[56] References Cited

U.S. PATENT DOCUMENTS

| | | | |
|---|---|---|---|
| 3,500,240 | 3/1970 | Kessler | 372/94 |
| 3,538,453 | 11/1970 | Miller | 372/94 |
| 4,578,793 | 3/1986 | Kane et al. | 372/50 |
| 4,764,933 | 8/1988 | Kozlovsky et al. | 372/22 |

FOREIGN PATENT DOCUMENTS 0217159  11/1979  Fed. Rep. of Germany ........ 372/30

OTHER PUBLICATIONS

Kane et al., "Monolithic Undirectional Single-Mode Nd:YAG Ring Laser"; Feb. 1985; vol. 10, No. 2, Optics Letters pp. 65–67.

*Primary Examiner*—Léon Scott, Jr.

[57] ABSTRACT

A bilithic laser resonator having a first block separated from a second block by a gap that can be adjusted to tune the wavelength of the laser. At least one of these blocks consists of a material that is capable of lasing and at least one of these blocks consists of a material that is capable of producing Faraday rotation of an optical beam.

11 Claims, 2 Drawing Sheets

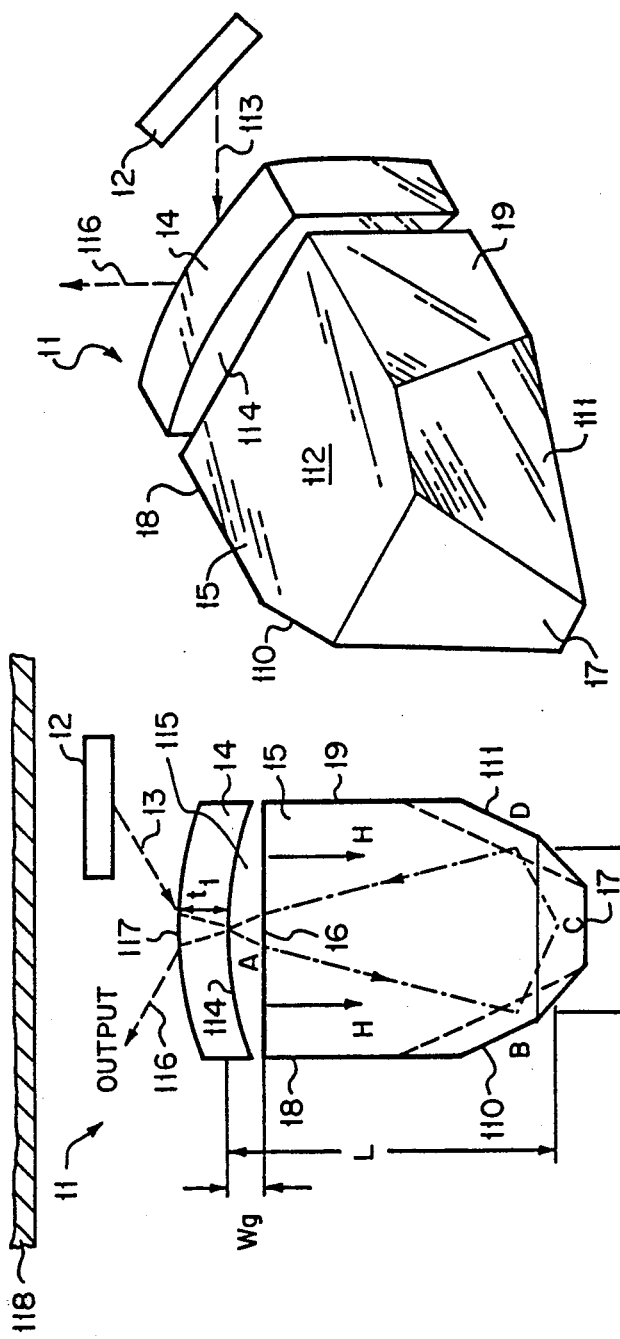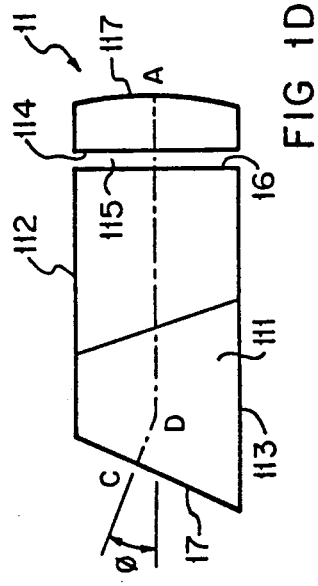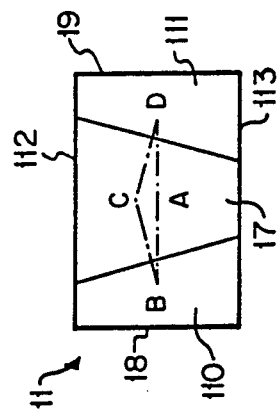

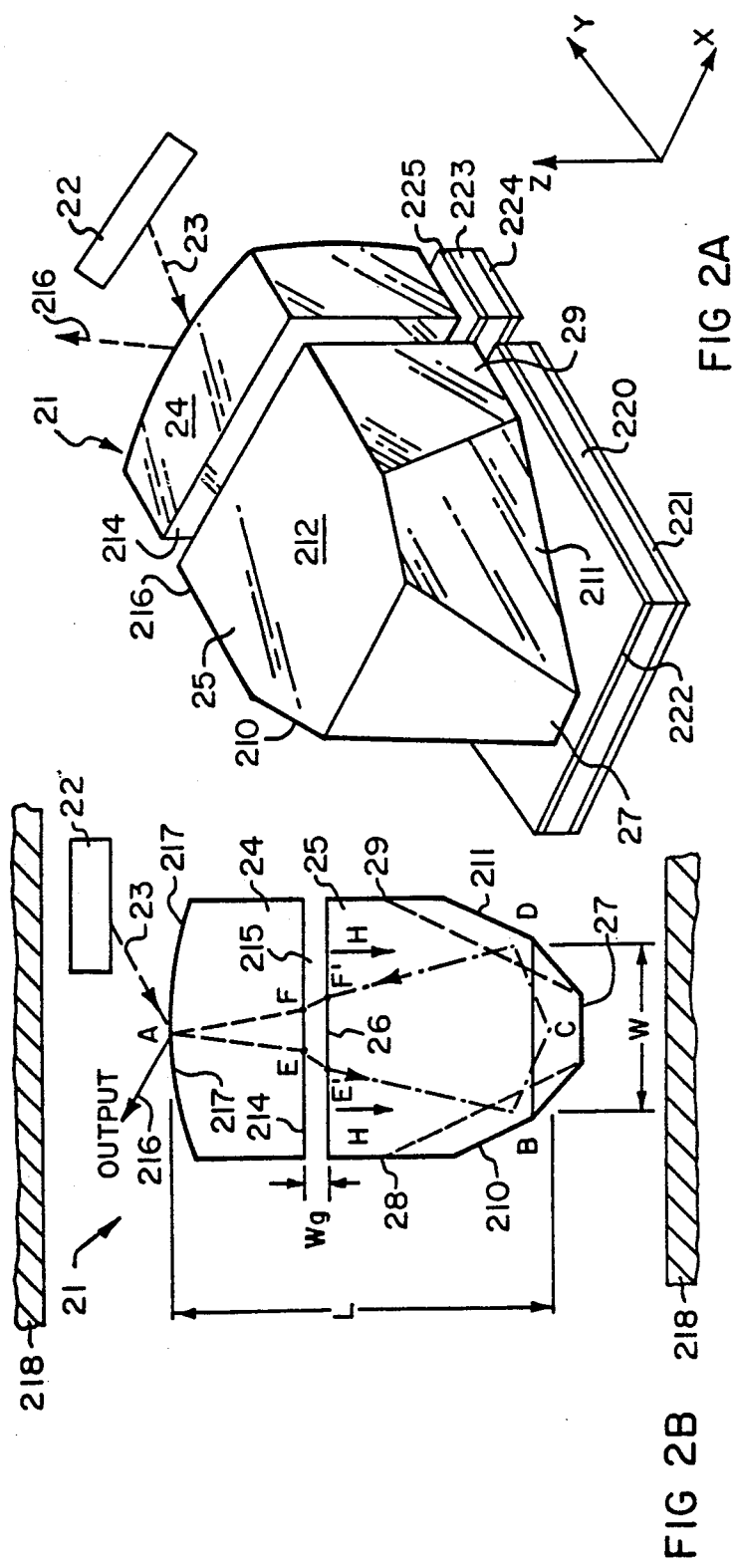
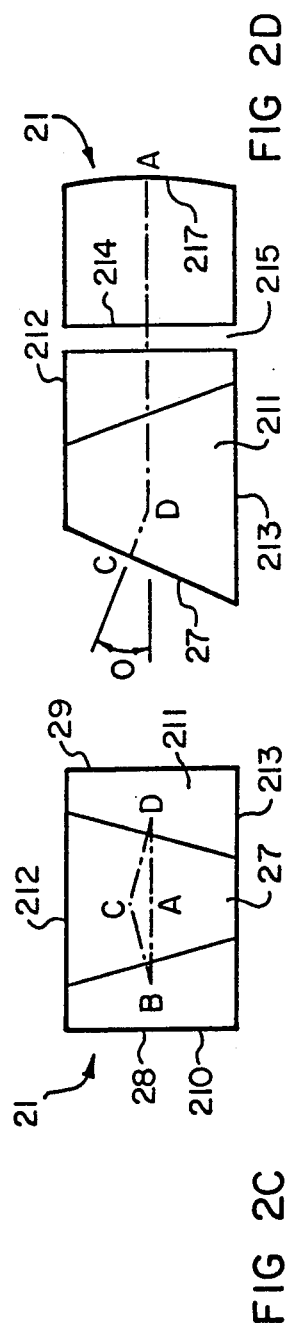
FIG 2A
FIG 2B
FIG 2C
FIG 2D

BILITHIC UNIDIRECTIONAL RING LASER

FIELD OF THE INVENTION

This invention relates in general to lasers and relates more particularly to ring lasers.

DEFINITIONS

A "bilithic" device is a device consisting of a pair of discrete components.

A "ring" is a closed path traversed by the laser beam within the ring laser.

A "supported mode" of a ring laser is a mode in which the net amplification for a single pass around the ring is equal to or greater than one.

An "unsupported mode" of a ring laser is a mode in which the net amplification for a single pass around the ring is less than one.

A "minor angle between a pair of planes" is the smaller of two angles formed between a pair of intersecting planes. Parallel planes, by definition, have a minor angle of intersection of zero degrees.

BACKGROUND OF THE INVENTION

In conventional lasers, a laser cavity establishes standing wave modes that function to select the frequencies at which the laser operates. In many applications, including optical communications utilizing optical fibers, it is advantageous for the laser to provide a single-mode beam of light. For optical fiber communication, the wavelength of this single mode should be within the wavelength range in which the optical fiber has minimal attenuation and/or minimum dispersion. At present, this wavelength is on the order of 1.3 microns.

To be commercially viable, the laser should have low power requirements, high reliability, modest size and reasonable cost. To accomodate 100 Megabaud data rates, the linewidth of this single laser mode should be less than 200 kilohertz using heterodyne detection and phase-shift keying data encoding and the laser frequency should be equally stable. Ring lasers have proven to meet these requirements.

In a ring laser, a travelling mode is utilized in place of the standing modes of conventional lasers. An optical source provides light that travels around a closed path (the "ring") within the laser. A typical ring laser (See, for example, U.S. Pat. No. 3,824,492 by Michael J. Brienza, et al, entitled "Solid State Single Frequency Laser", issued July 16, 1974), includes three or more reflective elements to direct a travelling wave around the ring. Since waves can travel in either direction around this ring, such a ring could support modes travelling in opposite directions around the ring.

To ensure single mode oscillation of the laser, the ring laser design should support only one of these two travelling wave modes. The reason for this is that, if modes in both directions of travel are supported, then these modes will interfere spatially to produce spatial variation of the beam intensity around the ring. There is a periodic pattern of nodes and antinodes separated by ¼ of a wavelength. Because of gain saturation, the gain is reduced where the optical intensity is maximum. Therefore, the gain is also spatially modulated with the maximum gain regions lying at the nodes of the optical interference pattern. This phenomenon is known as "spatial hole burning". Because the wavelengths of adjacent modes are slightly different, the spatial interference patterns generated by the two modes will not coincide. Therefore, each mode will extract gain from spatial regions not saturated by the adjacent mode. For this reason, bidirectional rings and linear ring resonators tend to oscillate in more than one mode.

Support of only one of these two travelling modes has an additional advantage. Many laser applications result in some of the light emitted from the laser reflecting back into the laser. Such reflected light will destabilize the operation of the laser. In a ring laser, such reflected light is in the direction of the unsupported travelling wave mode and therefore is attenuated before it can significantly affect laser operation.

In a typical discrete component ring laser (see, for example, U.S. Pat. No. 3,824,492 by Brienza et al entitled "Solid State Single Frequency Laser" issued July 16, 1974), the polarization of the travelling wave beam is rotated by a wave plate and is also rotated by a Faraday rotator. For the supported mode, these two rotations cancel so that the polarization is unchange by a complete traversal of the ring. For the unsupported mode, these two rotations add to produce a net rotation around the ring. A polarizer is located within the ring to attenuate the unsupported mode and to transmit substantially all of the supported mode. This selective attenuation assures that only one of these two modes is supported.

In the monolithic unidirectional ring laser presented in U.S. Pat. No. 4,747,111 by Trutna, Jr. et al. entitled "Quali-Planar Monolithic Unidirectional Ring Laser" issued May 24, 1988, a single block of material is shaped to direct the a travelling wave beam around a ring and to rotate the polarization of the beam, thereby avoiding the need for a wave plate. This beam reflects off of four sides of this block. This block is formed out of a material that is selected to lase at the wavelength of this travelling wave beam and is also selected to act as a Faraday rotator in the presence of an applied magnetic field. For one direction around the ring, there is a geometrical polarization rotation induced by the out-of-plane reflections that is cancelled by the Faraday rotation allowing a low loss reflection from the polarizing output mirror. In the other direction, the two rotations add leading to an attenuation of the beam by the lossy polarizer. Unfortunately, this laser is not tunable so that it is limited to applications in which only a single beam frequency is needed.

SUMMARY OF THE INVENTION

In accordance with the illustrated preferred embodiments, a tunable ring laser is presented. This laser includes an optical source and two blocks of material separated by a gap. At least one of the blocks is capable of lasing at a selected laser wavelength and at least one of these blocks, in the presence of an applied magnetic field, produces Faraday rotation of the laser beam as it travels around the ring.

These two blocks contain at least four reflecting surfaces that are oriented to reflect the beam around a closed path (the "ring"). For one direction of travel around the ring (the "support mode direction"), the laser beam experiences a greater amplification than the opposite direction around the ring (the "unsupported mode direction"). The net amplification for a complete traversal around the loop is greater than one for the supported mode and is less than one for the unsupported mode.

The two blocks are mounted on a translation stage that can translate one block relative to the other. Such translation varies the width of a gap between the blocks to vary the frequency of the supported mode.

In a first class of embodiments, the ring is contained within the region consisting of one of these two blocks plus the gap between these two blocks. In a second class of embodiments, the ring is contained within the region consisting of both blocks and the gap between these two blocks. In a third class of embodiments, one block is glass and the other block is a material, such as a Neodymium doped Yttrium-Aluminum-Garnet (denoted Nd:YAG) or Neodymium doped gadolinium gallium garnet (denoted Nd:GGG), capable of lasing and introducing Faraday rotation. In a fourth class of embodiments, one of the blocks is of a material capable of lasing and the other block is of a material capable of producing Faraday rotation in an applied magnetic field. This latter class of embodiments has the advantage of enabling separate selection of the material capable of lasing and the material capable of Faraday rotation, thereby enabling each of these choices to be separately optimized.

DESCRIPTION OF THE FIGURES

In the Figures, the first digit of a reference numeral indicates the first figure in which appears the element indicated by that reference numeral.

FIG. 1A is a projective view of first embodiment of the ring laser in which the ring is contained in a first block and a gap between this block and a second block.

FIGS. 1B-1D are top, end and side views, respectively, of the ring laser of FIG. 1A.

FIG. 2A is a projective view of first embodiment of the ring laser in which the ring is contained in a first block and a gap between this block and a second block.

FIGS. 2B-2D are top, end and side views, respectively, of the ring laser of FIG. 2A.

DESCRIPTION OF THE PREFERRED EMBODIMENTS

FIGS. 1A-1D illustrate a tunable ring laser consisting of a bilithic laser resonator 11 and an optical pump source 12. Bilithic laser resonator 11 includes a first block 14 and a second block 15, separated by a gap 115. Block 15 is bounded by a first end surface 16, a second end surface 17, a pair of side surfaces 18 and 19, a pair of bevel surfaces 110 and 111, a top surface 112 and a bottom surface 113. Block 14 directs an input beam 13 from optical source 12 through a reflection vertex A on a surface 114 of block 14. This beam then reflects off of surfaces 110, 17, 111 and 114 to form a ring ABCDA. For the supported mode travelling around ring ABCDA in the counterclockwise direction, the reflections at reflection vertices B, C and D are total internal reflections. The beam enters and exits surface 16 at Brewster's angle so that this surface acts as a partial polarizer. Light polarized in the plane of FIG. 1B suffers no reflection loss on transmission, while light polarized perpendicular to the plane of FIG. 1B is largely reflected (approximately 30% for YAG). Surface 114 is coated with a multilayer dielectric film so that, at reflection vertex A, most of the laser beam is reflected, but part of the laser beam exits through block 14 as laser output beam 116. Surface 114 is curved to focus the optical beam as it reflects off of this surface. Surface 117 also has a curvature relative to surface 114 such that block 14 corrects some of the optical astigmatism in output beam 116 introduced by the off-axis reflections and refractions from surface 114.

The primary functions of block 14 are to let beam 13 pass into block 15, to let a portion of the laser beam exit as output beam 116 and to reflect most of the beam incident from reflection vertex D onto reflection vertex A. Thus, a wide selection of materials can be utilized for block 14, including glasses and quartz.

Block 15 functions to amplify the laser beam and to rotate the polarization of the laser beam. Thus, block 15 consists of a material, such as a neodymium doped yttrium-iron-garnet (denoted Nd:YAG), that can amplify the laser beam by stimulated emission and that can rotate the polarization of the laser beam by Faraday rotation.

Input beam 13 is polarized parallel to the plane of FIG. 1B so that the fraction of this beam transmitted into block 14 is maximized as a function of this polarization and so that this same polarization is present at reflection vertex A. In the presence of a magnetic field H, this polarization rotates as the beam travels within block 15. The directions of the normals to surfaces 16, 110, 17 and 111 and the amount of Faraday rotation are selected so that, for the supported mode, the geometrical polarization rotation introduced by the nonplanar geometry and the Faraday rotation cancel. In this case, low loss linear polarization circulates through the Brewster angle polarizer (surface 16) unchanged on each round trip. In other words, linear polarized light is a polarization mode of the resonator. However, for the nonsupported mode, the two polarization rotations add, leading to a higher loss elliptically polarized polarization mode.

In one particular embodiment, minimum attenuation for the supported mode occurs for the following choice of parameters: width $W=4.91$ mm, length $L=4.70$ mm, thickness $t=1$ mm for element 14, a gap width $w_g=0.7$ mm, an applied magnetic field of about 2,000 Gauss, a pump threshold of 10 mW, and a Nd dopant concentration of 1.1%, a 4 mm radius of curvature of surface 114, approximately 0.45 degree out-of-plane normals to surfaces 110, and 111, and an approximately 1 degree out-of-plane normal to surface 17. The directions of the normals are selected to produce a minor angle $\phi$ between plane ABD (i.e., the plane containing reflection vertices A, B and D) and plane CBD (i.e., the plane containing reflection vertices C, B and D) less than 45 degrees. Preferrably, angle $\phi$ is in the range 0.5-2.0 degrees. Such a choice of angle $\phi$ means that the amount of Faraday rotation of the beam is equally small. This enables the use of relatively small magnetic field (on the order of 100 Gauss), thereby enabling the use of an inexpensive magnet 118 to produce magnetic field H. Such small angle $\phi$ means that the geometrical polarization rotation will be sufficiently small that it can be canceled by the weak Faraday rotation in the YAG crystal. If $\phi$ is too large, then there will be a net polarization rotation on one round trip which leads to a lossy elliptically polarized mode. If $\phi$ is too large, the intracavity loss will be too large to sustain laser action.

After a complete traversal of ring ABCDA, the beam returns to reflection vertex A with zero net change in polarization. The pathlength of ring ABCDA is an integral multiple of the wavelength of the supported mode. As the width $W_g$ of gap 115 is varied, the wavelength of the supported mode is varied to keep constant the number of wavelengths around the ring. Thus, the wavelength of the laser beam is tuned by varying the width of gap 115.

In other embodiments, the input pumping beam 13 can be injected at some point in the ring other than at point A. For example, the normal to surface 210 can be selected so that the light is not totally internally reflected, but instead reflects at an angle that enables light to be injected at point B and to also be extracted at that point. A dielectric film mirror would also be deposited on surface 210 to enhance the reflectivity for the lasing mode.

FIGS. 2A-2D illustrate a bilithic laser resonator in which the ring extends into both components of the laser resonator and is contained within the region consisting of both components of the laser resonator plus the gap between these two sections. This embodiment corresponds closely to the embodiment of FIGS. 1A-1D. Corresponding elements in these two embodiments are indicated by reference numerals that differ only that in FIG. 1 all reference numerals begin with a 1 and in FIG. 2 all reference numerals begin with a 2. In this embodiment, reflection vertex A is located on surface 216, whereas in the embodiment of FIGS. 1A-1D, reflection vertex A is located on surface 114. As a result of this difference, part of the ring is contained in block 24, whereas none of the ring in the embodiment of FIGS. 1A-1D is contained in block 14.

This difference between these two embodiments produces the following advantage of the embodiment of FIGS. 2A-2D. All of the amplification can be provided by block 24 and all of the Faraday rotation can be provided by block 25. This enables the choice of material for block 24 to be made without any constraint that such material must also be able of provide Faraday rotation, and enables the choice of material for block 25 to be made without any constraint that such material must also be able to lase. Thus, each of these choices can be separately optimized. Preferred choices for block 24 are rare earth doped crystals such as Nd doped yttrium aluminum garnet (Nd:YAG) crystals and Nd doped gadolinium gallium garnet (Nd:GGG) crystals. In particular, Nd doped YAG crystals are preferred because they presently are one of the best lasing materials. Preferred choices for block 25 are any materials having a large Verdet constant (i.e., exhibit a strong Faraday rotation) and having low absorption at 1.3 microns. For example, M16 Faraday Rotation Glass is available from Kigre, Inc., 100 Marshland Road, Hilton Head, S.C. 29928. Other choices for block 25 are zinc selenide crystals, as well as SF-6 and SF-57 available from Schott Glass Technologies, Inc., 400 York Avenue, Duryea, Pa. 18642.

As illustrated above, use of a bilithic laser resonator has the advantages of: (a) providing tunability; (b) limiting the number of components to the smallest number (two) that allows such tunability via variation of the gap between these components; and (c) enabling embodiments in which the lasing material and Faraday rotating material can be separately selected. By limiting the number of components to two, the amount of alignment required is minimized subject to the constraint that the laser be tunable.

There are a number of existing devices that can be utilized to vary the width $W_g$ of gap the gap between the two blocks. For example, roller bearing stages and flexure pivot stages are particular examples. In the preferred embodiment illustrated in FIG. 2A, blocks 24 and 25 are mounted on piezoelectric shear plates that consist of piezoelectric crystals 221 and 223 plus electrodes 221, 222, 224, and 225. In this particular embodiment, the polarity between plates 221 and 222 is opposite to that between plates 224 and 225 so that these two shear plates operate in a push-pull arrangement—namely, when shear plate 220 moves block 25 in the $-y$ direction, shear plate 223 moves block 24 in the $+y$ direction. In alternate embodiments, one or the other of these two shear plates is replaced by a rigid mount for its associated block. Alternatively, an expansion mode piezoelectric crystal attached to an end of one of these blocks can be used to translate that block. These embodiments have the advantage of simplicity and of providing a rigid support for both blocks.

Because piezoelectric materials exhibit hysteresis, there is no 1—1 relationship between the applied voltage and the amount of translation of the associated block. Therefore, a mechanism is included for determining the amount of variation of the gap $W_g$. In one embodiment, optical encoders are included on one or both of the blocks and sensing means measures the amount that block is translated. In another embodiment, the laser frequency is measured and this value is utilized to adjust $W_g$ until the laser frequency is equal to the selected frequency.

I claim:

1. A bilithic laser resonator comprising:
   a first block;
   a second block, separated by a gap of width $W_g$ from the first block;
   at least one of said first and second blocks being of a material capable of lasing;
   at least one of said first and second blocks being of a material capable of producing Faraday rotation of an optical beam travelling therein;
   means for varying the width $W_g$ of said gap;
   means for defining, within a region consisting of the first and second blocks and the gap between these two blocks, a resonant unidirectional ring that includes at least four non-coplanar reflection vertices
   input means for injecting an input beam of light into said ring to pump the laser; and
   output means for extracting an output laser beam from light in said unidirectional ring.

2. A resonator as in claim 1 wherein:
   said input means and output means comprise a first surface of said first block upon which an input beam of light is to be incident, a portion of this input beam passing through said first surface into said ring; and
   a portion of the light in said ring passing across said first surface to produce an output beam.

3. A resonator as in claim 1 wherein:
   the ring is contained within the region consisting of the second block and the gap between the blocks
   the ring has a reflection vertex on a surface of the first block; and
   the second block consists of a material that is capable of lasing and producing Faraday rotation.

4. A resonator as in claim 3 wherein the first block is transparent.

5. A resonator as in claim 1 wherein:
   the ring extends into the first block, the second block and the gap between these two blocks;

6. A resonator as in claim 5 wherein:
   the first block consists of a material that is capable of lasing; and the second block consists of a material that is capable of producing Faraday rotation in the presence of a magnetic field.

7. A resonator as in claim 5 wherein:
the second block consists of a material that is capable of lasing; and
the first block consists of a material that is capable of producing Faraday rotation in the presence of a magnetic field.

8. A resonator as in claim 1 wherein said means for varying the gap comprises a piezoelectric shear plate upon which one of said first and second blocks is mounted, said shear plate translating said block in response to an applied control signal.

9. A resonator as in claim 1 wherein the minor angle between pairs of planes, each containing three successive reflection vertices on the ring, is less than 45 degrees.

10. A resonator as in claim 9 wherein the minor angle between said pairs of planes is less than 10 degrees.

11. A resonator as in claim 9 wherein the minor angle between said pairs of planes is the range 0.5–2.0 degrees.

* * * * *